United States Patent [19]

Case et al.

[11] Patent Number: 4,671,691
[45] Date of Patent: Jun. 9, 1987

[54] BALL-POINT WRITING INSTRUMENT CONTAINING AN AQUEOUS INK COMPOSITION

[75] Inventors: Laura K. Case, Winchester; Chandrasen Gajria, Hingham; Rachel M. Loftin, Halifax; Henry Peper, Marblehead, all of Mass.

[73] Assignee: The Gillette Company, Boston, Mass.

[21] Appl. No.: 693,930

[22] Filed: Jan. 23, 1985

[51] Int. Cl.⁴ .......................... B43K 7/08; B43K 7/10
[52] U.S. Cl. .................................. 401/142; 106/20; 106/22; 106/23; 106/25
[58] Field of Search ...................... 106/22, 25, 26, 23, 106/30, 32; 401/141, 142, 213

[56] References Cited

U.S. PATENT DOCUMENTS 3,526,522  9/1970  Seregely .............................. 106/270
3,656,857  4/1972  Seregely .............................. 106/270

FOREIGN PATENT DOCUMENTS 2094820  3/1982  United Kingdom .
2131040  6/1984  United Kingdom .

*Primary Examiner*—Paul Lieberman
*Assistant Examiner*—John F. McNally
*Attorney, Agent, or Firm*—John P. Morley

[57] ABSTRACT

Gelled, aqueous inks are used in conjunction with viscoelastic ink follower compositions to avoid the necessity of using a fibrous ink reservoir or a porous or extruded ink feed rod.

13 Claims, No Drawings

BALL-POINT WRITING INSTRUMENT CONTAINING AN AQUEOUS INK COMPOSITION

The present invention relates to ball-point pens employing specially thickened aqueous inks in conjunction with an ink follower of novel properties which together overcome the usual problems associated with the use of aqueous inks.

While there are long-recognized cost advantages in employing aqueous ink compositions in ball-pen writing instruments, their typically low viscosity leads to a number of performance disadvantages. These include the possibility of leakage around the rotating ball due to changes in atmospheric pressure or temperature or due to temperature increases resulting from the heat conducted from the fingers of the user. Attempts have been made to overcome these disadvantages by employing a fibrous ink reservoir intended to supply a flow of ink to the rotating ball at a rate just sufficient to result in the formation of a continuous line during use but insufficient to provide an excess supply of liquid ink at the writing tip leading to leakage. Other attempts to accomplish the same result have involved the use of liquid ink reservoirs employing porous ink feed rods in the form of sintered fibrous bundles or extruded plastic ink rods having capillary channels and intended to control the rate of ink feed to the rotating ball. Examples of prior art patents employing such systems to control the flow of aqueous inks in ball-pen writing instruments include British patent specification No. 1,139,038 and U.S. Pat. Nos. 3,446,564; 3,533,708; 3,572,954; 3,873,218; and 4,145,148.

The disadvantages of using an ink-feeding system of the types discussed above include failure to provide a sufficiently continuous flow of ink to the ball for rapid use and a reduced writing life since the amount of ink retained by a fibrous reservoir may amount to as much as one-half of the total amount of ink in the writing instrument. A further disadvantage lies in the fact that inks containing pigments as opposed to soluble dyes will tend to clog the capillary passages in fibrous reservoirs and feed rods further inhibiting the rate of flow and the amount of ink which is delivered to the point before the writing instrument becomes inoperative.

If it is attempted to solve the above problems by leaving out the fibrous reservoir and/or capillary feed rod and simply thickening the aqueous ink composition, another problem is encountered. Should the continuity of the ink column above the rotating ball be broken by solvent evaporation from the point or from shock during shipping or dropping, it is likely that the pen will become non-functional.

SUMMARY OF THE INVENTION

We have discovered that the problems inherent in the use of aqueous ink compositions in rotating ball-point writing instruments can be overcome by employing a fluid reservoir of ink of specific rheological properties which is in direct contact with the ball, i.e. which avoids the use of a fibrous ink reservoir or a porous or extruded ink feed rod. In a preferred form of the invention, the ink is used in conjunction with an ink follower composition having specific rheological properties to insure a smooth and continuous flow of ink to the rotating ball as the ink supply is consumed. In another preferred form of the invention, a writing instrument employing both the ink and ink follower of this invention is combined with a cap member constructed to seal the ball-point and tip when the cap is in place thereby preventing evaporation of volatile components of the ink and leakage of air around the ball into the ink reservoir which might result in the formation of a gas bubble upstream of the rotating ball leading to product failure.

DETAILED DESCRIPTION OF THE PREFERRED EMBODIMENTS

The ink compositions employed in the practice of this invention are thickened liquids at rest. While some are characterized by having a rheological yield value, all are highly pseudoplastic or shear-thinning in use. The inks become thin liquids, having a viscosity of less than 100 cPs, at the high shear rates produced in writing with a ball-point pen. The inks contain at least one water-dispersible gum or resin as described hereinbelow along with one or more highly polar solvents, preferably water, and coloring matter including dyes and/or pigments. The inks may also contain other conventional ingredients including surfactants, preservatives, corrosion inhibitors, and humectants.

The shear thinning properties of the inks to be used in the practice of the invention can be characterized by the shear thinning index "n" calculated by fitting shear stress (T) and shear rate (j) values (obtained from rheological measurements on a viscometer such as the Haake Rotovisco, Haake Inc., Saddle Brook, NJ) to the empirical power law equation $T = Kj^n$ (K and n are calculated constants). The polymers useful in the practice of this invention are those that give relatively low "n" values ranging from 0.01 to 0.60. Preferred polymers give "n" values of 0.05 to 0.30.

Xanthan gum based ink compositions have been found to have 'n' values of 0.10–0.20, and these compositions are preferred for this invention. Another preferred polymer is carrageenan gum. Equilibrium shear stress values for carrageenan based inks (obtained by repeated measurements on the Haake Rotovisco) fitted to the power law yield a shear thinning index of 0.3–0.4. Hydroxyethyl cellulose is another polymer whose ink compositions can be used in this invention. Ink compositions based on hydroxyethyl cellulose are less preferable, however, having a shear thinning index calculated to be 0.4–0.6.

The water-dispersible gums or resins to be used in the practice of the invention may be either natural or synthetic. The natural gums include seaweed extracts, plant exudates, seed or root gums and microbiologically fermented gums. Synthetic gums and modified versions of cellulose or starch include propylene glycol alginate, carboxymethyl locust bean gum and carboxymethyl guar. Many water-dispersible gums can also be described as polysaccharides, since their structure consists of repeating sugar units. Examples of water-dispersible gums suitable for use in this invention include: xanthan gum (Keltrol and Kelzan, made by the Kelco Company), carboxymethylcellulose (sold as a sodium salt by Hercules, Inc.), hydroxyethylcellulose (Natrosol manufactured by Hercules, Cellosize by Union Carbide), sodium alginate and other salts of alginic acid (Kelgin, Kelcosol, Keltex, Superloid, Keltose, Kelset, Kelmar, Kelcoloid, all manufactured by the Kelco Company), kappa, iota and lambda carrageenan (sulfated polysaccharides extracted from red seaweed), gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives (Jaguar, manufactured by Stein-Hall), locust bean gum (a branched galactomannan), tamarind gum, psyllium seed gum, quinch seed gum, larch gum, pectin and its derivatives, dextran, hydroxypropylcellulose (Klucel, manufactured by Hercules), cellulose ethers (Methocel, manufactured by Dow Chemical) and other water-soluble gums of this type. While the amount of a particular water-dispersible gum or resin to be used in the practice of the invention will vary depending upon which gum or other ingredients are used, it is possible in most cases to achieve an "n" value of from 0.01 to 0.60 by incorporating from 0.1 to 5.0% by weight of the overall composition of gum or resin. In the case of the preferred thickeners and preferred range of "n" values described hereinbefore, we prefer to employ from 0.1 to 2.0% by weight of water-dispersible gum or resin.

The ink compositions of this invention are based upon the use of polar solvents (preferably water) which comprise from 50 to 99% by weight of the ink. Although water is preferred as mentioned above, other polar solvents may be used in place of up to 50% of the water. These solvents, which can be thought of as hygroscopic wetting agents useful in reducing the ink drying rates include dihydric alcohols such as ethylene glycol, diethylene glycol, triethylene glycol, 1,3-propanediol, propylene glycol, 1,3-butylene glycol, 1,4-butanediol, 2,3-butylene glycol, neopentyl glycol, hexylene glycol, thiodiglycol, and the like. It is also possible to employ tri- and higher-hydric alcohols such as glycerin, trimethylolethane, trimethylolpropane, 3-methyl pentane-2,3,5-triol, diglycerin, sorbitol, and the like. Other polar-solvent wetting agents may include pyrrolidone, N-methyl-2-pyrrolidone, dimethylformamide, urea, and the like.

It has also been found useful to include in the ink compositions of this invention an organic solvent material capable of penetrating into the paper-writing surface to act as a drying agent and also to act as a levelling agent for the ink to produce a smooth writing result. Examples of such materials include:

(a) glycol ethers such as ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether, ethylene glycol dimethyl ether, ethylene glycol diethyl ether, diethylene glycol dimethyl ether, propylene glycol monomethyl ether, and the like;

(b) glycol ether acetates such as ethylene glycol monomethyl ether acetate, ethylene glycol monoethyl ether acetate, ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate, propylene glycol monomethyl ether acetate, and the like; and (c) glycol acetates such as ethylene glycol monoacetate, ethylene glycol diacetate, diethylene glycol diacetate, and the like.

We especially prefer to employ in the drying and levelling function complex fluorinated polysilane surface active agents such as the product sold under the trademark LEVELENE 100 (American Color & Chemical Corp.). These materials, when employed, can be used in amounts of 0.01 to 2.0% by weight, preferably 0.1 to 1.0%.

The coloring matter to be employed in the inks of this invention may be any of the water-soluble or dispersible dyes or pigments or mixtures thereof known to be useful in the formulation of inks for writing instruments and may comprise up to 30% by weight of the inks. Examples of dyes or pigments which can be used include, but are not limited to, Direct Violet 99, Direct Blue 86 (C.I. 74180), (both manufactured by the Mobay Chemical Co.); Elftex 5, Mogul L. and Regal 330R, all carbon blacks (The Cabot Corporation) Hidracol X9220 and X9200 (Ciba-Geigy); and Fast Light Orange 2GM (American Cyanamid).

As is known to those skilled in the art, some water-dispersible polymers such as xanthan gum, carboxymethylcellulose, and alginic acid salts, mentioned above, require the use of sequestering agents for stability. These sequesterants are normally added in the amount of 1-50% by weight of the water-soluble gum. Examples of useful sequestering agents include sodium hexametaphosphate, trisodium phosphate, and sodium glucoheptanate, and tetrasodium EDTA.

Ink formulations thickened by the presence of polysaccharide gums generally require the use of preservatives to prevent the growth of microorganisms, yeast, and mold. Examples of such perservatives include methyl p-hydroxybenzoate, propyl p-hydroxybenzoate. Dowicil 75 and 200 (active ingredient: 1-(3-chloroallyl)-3,5,7-triaza-1-azoniaadamantane chloride (Dow Chemical Co.). These biocides are typically present at 0.01–5% by weight of the ink.

When aqueous ink formulations are likely to come in contact with metals, it is possible that corrosion will occur. This can result in degradation of the metal surface over time. To prevent this occurrence, corrosion inhibitors such as benzotriazole are often used. Such materials may constitute up to 5% by weight of the ink but are preferably used in amounts less than 0.5%.

The inks of this invention are easily prepared by combining the desired ingredients in a blender or mixing with a propeller stirrer until homogeneity is achieved. Preferably the water-dispersible polymer is first added to distilled water and this combination mixed for about two hours. The other ingredients, if present, are added in the following order: other polar solvents, sequestering agents, preservatives, surfactants, corrosion inhibitors, and dyes and/or pigments. In some cases, it is advisable to pre-wet the water-dispersible gum with a humectant such as propylene glycol or glycerol. Generally, the amount of such humectant is 1 to 5 times by weight of the amount of water-soluble gum added.

Typical formulations of inks to be used in the practice of this invention follow.

EXAMPLE I

| Material | Weight % |
| --- | --- |
| Xanthan Gum | 1.00 |
| EDTA (tetrasodium) | 0.30 |
| Fluorinated polysilane surface active agent (LEVELENE 100, American | 0.50 |

-continued

| Material | Weight % |
|---|---|
| Color and Chemical Co.) | |
| Benzotriazole | 0.20 |
| Methyl p-hydroxybenzoate | 0.30 |
| Propylene glycol | 15.00 |
| Dye (Direct Violet 99) | 6.00 |
| Water | 76.70 |

EXAMPLE II

| Material | Weight % |
|---|---|
| Hydroxyethylcellulose | 1.25 |
| Dye-(Fast Light Orange 2GM) | 3.30 |
| Dye (Hidacid FTM Violet 49) | 2.20 |
| Polyoxyethylene 20 sorbitan monolaurate (Tween 20) | 0.50 |
| Benzotriazole | 0.20 |
| Methyl p-hydroxybenzoate | 0.30 |
| Water | 92.25 |

It is conventional in ball-point pens having non-shear-thinning inks of low viscosity to employ a follower in the ink reservoir behind the ink supply at the opposite end from the ball point to prevent back leakage of the ink. Ideally, such followers do not inhibit the flow of ink to the point and maintain their location when the writing instrument is dropped. In addition, these followers should not show any syneresis or separation over time nor break apart during use.

During writing, the ink within the reservoir is depleted and the follower, which is in contact with both the top surface of the ink and the walls of the reservoir, moves toward the rotating ball as the ink level drops. The follower should maintain its coherence and integrity and should be insoluble and immiscible with the ink. It is desirable that the follower composition should not adhere to the walls of the reservoir as the ink supply is consumed.

Heretofore, ball-point pens containing aqueous-based inks have been fabricated to store the ink supply in a fibrous reservoir. The shear thinning inks of this invention require no fibrous reservoir to contain the ink but rely on the use of a follower with properties described hereafter. In addition to prevention of ink runback due to gravity leakage, the follower retards the evaporation of the ink solvents.

We have found that the feeding of the shear thinning inks described hereinabove to the rotating ball can be unexpectedly improved and the risk of shock breakage in the ink column above the ball reduced by the use of a viscoelastic follower composition which exhibits predominantly elastic response at low frequency or shear rate and a predominantly viscous response at a high frequency or shear rate. Such compositions have been found to follow the ink column as the ink is consumed with minimum adhesion to the walls of the reservoir and to act as a good shock absorber if the pen is dropped, thus reducing the risk that the ink column will become broken leading to premature failure.

An additional benefit of many of the viscoelastic followers described by this invention is their maintenance of a stable interface between the ink and follower during periods of long-term, elevated temperature storage. Non-viscoelastic followers tend to physically separate from the ink surface under such storage conditions.

In an experiment designed to compare the behavior of viscoelastic and non-viscoelastic followers, the following two compositions were compared. Composition A comprised a mixture of 49% mineral oil (Kaydol, White Mineral Oil, Witco Chemical Co.). 49% polybutene (M.W. 2500), and 2% of a thickening agent, dimethyldioctadecylammonium bentonite (Bentone 34 from National Lead Company). Composition B comprised a mixture of 39% mineral oil, 58% polybutene, and 3% of the bentonite thickener.

Viscoelastic measurements of the two compositions were made using a Rheometrics Mechanical Spectrometer Model RDS-7700. (manufactured by Rheometrics Inc.. Piscataway, N.J.) fitted with 50 millimeter parallel plates having a 0.4 millimeter gap setting, making the frequency values convertible to shear rate in second $^{-1}$ units by multiplying by the numeral 62.5 (shear rate at 1 rad/sec.=62.5 sec$^{-1}$). The observed tan delta values obtained from the equipment at various frequencies are shown below in Table 1.

TABLE I

| Frequency in | Tan Delta Values | |
|---|---|---|
| Rad/Second | Composition A | Composition B |
| 0.10 | 0.69 | 4.82 |
| 0.16 | 0.72 | 2.77 |
| 0.25 | 0.80 | 5.07 |
| 0.40 | 0.85 | 3.67 |
| 0.63 | 0.92 | 3.88 |
| 1.00 | 0.84 | 3.25 |
| 1.59 | 1.18 | 4.28 |
| 2.51 | 1.46 | 2.95 |
| 3.98 | 1.83 | 2.75 |
| 6.31 | 2.34 | 2.51 |
| 10.00 | 2.98 | 2.39 |
| 15.85 | 4.02 | 2.34 |
| 25.12 | 5.45 | 2.38 |
| 39.81 | 7.53 | 2.50 |
| 63.10 | 10.57 | 2.71 |
| 100.00 | 14.90 | 3.00 |
| 158.50 | 21.33 | 3.42 |
| 251.20 | 30.73 | 4.04 |
| 398.10 | 44.61 | 5.13 |
| 500.00 | 54.26 | 6.08 |

As shown by the above data, Composition A exhibited a steady increase in tan delta values over the range of measurement in a manner typical of viscoelastic compositions having a predominantly elastic response (low tan delta values) at low frequency or shear rate and predominantly viscous response (high tan delta values) at high frequency or shear rate. When evaluated in a ball-point pen containing an ink having shear thinning properties as described hereinabove, the follower was found to function satisfactorily, following the ink column toward the rotating ball and acting as a good shock absorber to prevent rearward movement of the ink upon dropping of the pen.

Examination of the data for Composition B, on the other hand, showed a generally random, fairly flat tan delta frequency relationship. When evaluated in a pen, Composition B was found to have high adhesion and poor flow characteristics, making it unsuitable for follower use.

A simple, non-instrumental method for determining whether or not a composition is viscoelastic is disclosed U.S. Pat. No. 3,425,779 wherein the test is described in the following language:

"As a practical matter it can be determined whether or not a marking or writing fluid has viscoelastic characteristics or properties as desired with this invention by a rather simple test. In this test a flat-bladed spatula is inserted within a body of a marking or writing fluid and is twisted a fraction of a turn about its axis. Such a spatula or similar instrument will remain in the position to which it is turned after being held in this position for a significant time interval such as ten minutes if the fluid is viscoelastic, but will tend to return to or towards its initial position if immediately released after being turned. The tendency of the spatula or similar instrument to move toward its original position when immediately released in this test is considered to demonstrate elastic characteristics whereas the tendency of the spatula or similar instrument to remain in place after being held for a time interval is considered to demonstrate that the fluid or composition is not truly elastic in an absolute sense, but that it possesses viscoelastic characteristics . . . "

The same method may be used in the evaluation of follower compositions for use in the practice of this invention.

A wide variety of follower compositions may be used in the practice of our invention. It is necessary, however, that such compositions exhibit at least a minimum viscoelasticity as defined hereinafter. The useful compositions are in general based on oily materials which have been thickened to a grease-like consistency. Examples of oils which may be used include petroleum oils, polyglycols, polyesters, polybutenes, and silicone oils. These may be thickened, as is well known in the art, by the inclusion of materials such as fatty acid metal soaps, modified clays, silica gel, carbon black, natural or synthetic rubber, and various synthetic polymers.

The preferred viscoelastic follower compositions, which may be used in the practice of our invention, comprise mixtures of mineral oil, polybutenes, and organophilic clay thickeners. The mineral oils to be used may comprise any of the conventional mineral oils known by those skilled in the art to be useful in the preparation of ink follower compositions including materials referred to as liquid paraffin, white mineral oil, or mixtures of liquid hydrocarbons from petroleum. These oils may have a viscosity in the range of about 100 to 2000 SSU (Seconds Saybolts Universal) at 35° C. The preferred viscosity range is from about 200 to 750 SSU at 38° C. The most preferred mineral oil is a white oil purified by hydrorefining and which has a viscosity in the range of about 300 to 400 SSU at 38° C.

The polybutenes may be used in the practice of our invention are those commercially available as mixtures of n-butylene and isobutylene polymers and which have a number average molecular weight ranging from about 500 up to about 5000 as measured by vapor pressure osmometry. We prefer to use polybutenes having an average molecular weight ranging from about 1000 to 3000.

The mineral oil-polybutene mixtures, which form the base of our preferred follower compositions, are thickened to form a grease-like composition by using organophyllic clays. These clays are obtained by treating bentonites or montmorillonites with onium compounds, especially ammonium compounds. The treated clays are organophilic and swell in organic fluids such as the above-described base oils forming stable gels. Mixtures of such organophilic clays can, of course, be used.

The specific proportions of the base oils and thickeners used will vary depending upon the particular oil and thickener employed. The proportions are critical however in producing a composition having the requisite viscoelastic properties. Based upon studies of the type described above and summarized in Table I, we have concluded that, to be useful in the practice of our invention, a follower composition must exhibit increasing tan delta values over the shear rate range of 5 to 30,000 sec.$^{-1}$ and must, in addition, exhibit tan delta values of less than 1 at shear rates up to 50 sec.$^{-1}$.

Our preferred follower compositions can be prepared by thickening mixtures of 5 to 99% by weight mineral oil and 5 to 99% by weight polybutene with from 0.1 to 10.0% by weight clay thickener. In general, the amount of clay thickener is the critical element with small added amounts rapidly altering the viscoelastic character of the composition, moving it outside of the frequency response parameters given above. In general, we prefer to use less than 5.0% by weight clay thickener.

In a preferred form of the practice of our invention, we include a mechanical element to further insure that the ink column adjacent the rotating ball does not become broken by being replaced by a gas bubble caused by evaporation of volatile solvent around the rotating ball or by entry of air around the ball due to dropping or by permitting the pen to remain upcapped during periods of non-use.

This preferred form of the invention comprises a ball-point writing instrument containing an aqueous shear-thinning ink as described above in combination with a viscoelastic follower as described above and employing in addition a cap member adapted to sealingly contact the pen tip comprising the rotating ball and its seat in a manner to prevent the passage of air or other gas between the surfaces of the ball and seat. Such a cap construction is shown in the prior art, inter alia, in U.S. Pat. No. 2,428,960 and typically employs a pad of soft polyvinyl chloride, polyurethane elastomer, natural or synthetic rubber or other relatively soft resilient material against which the ball and seat are sealingly engaged when the pen and cap are assembled in a closed position.

We claim:

1. A ball-point pen employing a liquid ink reservoir containing an ink having a viscosity less than 100 cPs at shear rates produced by writing and comprising a combination of ingredients consisting essentially of from about 50 to about 99% by weight of a polar solvent comprising at least 50 percent by weight water, up to about 30% by weight coloring matter, and sufficient water-dispersible gum or resin to provide a shear-thinning index of from 0.01 to 0.60 said reservoir including a viscoelastic ink follower having a composition which exhibits predominately elastic response at low frequency or shear rate and a predominately viscous response at a high frequency or shear rate.

2. A ball-point pen as described in claim 1 in which the shear thinning index of said ink is from 0.05 to 0.30.

3. A ball-point pen as described in claim 1 in which said polar solvent is water.

4. A ball-point pen as described in claim 1 in which said polar solvent is a mixture of a major proportion of water and a minor proportion of a second polar solvent.

5. A ball-point pen as described in claim 1 in which said water-dispersible gum or resin is xanthan gum.

6. A ball-point pen as described in claim 2 in which said water-dispersible gum or resin is carrageenan gum.

7. A ball-point pen as described in claim 1 in which said ink follower exhibits increasing tan delta values over the shear rate range of 5 to 30,000 sec.$^{-1}$ and exhibits, in addition, tan delta values of less than 1 at shear rates up to 50 sec.$^{-1}$.

8. A ball-point pen as described in claim 1 in which said viscoelastic ink follower comprises a mixture of from 5 to 99% by weight mineral oil, 5 to 99% by weight polybutene, and up to 10% by weight clay thickener.

9. A ball-point pen as described in claim 8 in which said polybutene has a number average molecular weight of from about 500 to about 5000.

10. A ball-point pen as described in claim 8 in which said clay thickener is selected from the class consisting of bentonites and montmorillonites which have been treated with an onium compound.

11. A ball-point pen as described in claim 1 in combination with a cap member adapted to sealingly contact the pen tip when the pen and cap are assembled in a closed position to prevent the passage of air or other gas between the surface of the ball and seat.

12. A ball-point pen as described in claim 1 where the water dispersible gum or resin is present in an amount from 0.10 to 5.0 percent by weight of the composition.

13. A ball-point pen as described in claim 1 where the water dispersible gum or resin is present in an amount from 0.10 to 2.0 percent by weight of the composition.

* * * * *